United States Patent
Shirahama et al.

(10) Patent No.: US 11,872,693 B2
(45) Date of Patent: Jan. 16, 2024

(54) ROBOT MECHANISM AND PARALLEL LINK ROBOT

(71) Applicant: NSK LTD., Tokyo (JP)

(72) Inventors: Kohei Shirahama, Kanagawa (JP); Sumio Sugita, Kanagawa (JP); Satoshi Inagaki, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/920,934

(22) PCT Filed: Dec. 2, 2021

(86) PCT No.: PCT/JP2021/044320
§ 371 (c)(1),
(2) Date: Oct. 24, 2022

(87) PCT Pub. No.: WO2023/002641
PCT Pub. Date: Jan. 26, 2023

(65) Prior Publication Data
US 2023/0122717 A1    Apr. 20, 2023

(30) Foreign Application Priority Data

Jul. 19, 2021 (JP) .................................. 2021-118750

(51) Int. Cl.
*B25J 18/00* (2006.01)
*B25J 9/00* (2006.01)

(52) U.S. Cl.
CPC ............ *B25J 18/00* (2013.01); *B25J 9/0045* (2013.01)

(58) Field of Classification Search
CPC ...... B25J 18/002; B25J 19/002; B25J 9/0033; B25J 9/123; B25J 9/144
See application file for complete search history.

(56) References Cited

U.S. PATENT DOCUMENTS 2,764,301 A * 9/1956 Goertz .................. B25J 19/002
                                                      414/7
3,543,910 A * 12/1970 Martin ............... G05B 19/4182
                                                    414/730
(Continued)

FOREIGN PATENT DOCUMENTS

CN     109895076 A     6/2019
CN     210850333 U     6/2020
(Continued)

OTHER PUBLICATIONS

JP Decision to Grant a Patent for JP 2022-516460, dated May 31, 2022.
(Continued)

*Primary Examiner* — Charles A Fox
*Assistant Examiner* — Gregory T Prather
(74) *Attorney, Agent, or Firm* — Sughrue Mion, PLLC

(57) ABSTRACT

A robot mechanism is provided with a parallel link including a first output base, a first parallel link mechanism disposed on a first side of the first output base, and a second parallel link mechanism and an end effector disposed on a second side of the first output base. The first parallel link mechanism includes a first driver that generates a linear motion output and a second driver that generates a linear motion output. A tilting link mechanism including a mass body that generates a second moment load in a direction to reduce a first moment load exerted on the first parallel link mechanism by the weight of the second parallel link mechanism and the end effector is connected to the first driver and the second driver.

19 Claims, 11 Drawing Sheets

(56) References Cited

U.S. PATENT DOCUMENTS

| | | | | | |
|---|---|---|---|---|---|
| 4,482,288 | A | * | 11/1984 | Rovetta | B25J 9/046 414/718 |
| 4,668,155 | A | * | 5/1987 | Kaufmann | B25J 9/046 901/18 |
| 5,186,343 | A | * | 2/1993 | Bozzi | B66C 11/10 212/291 |
| 5,738,481 | A | * | 4/1998 | Rogers | B25J 5/02 414/751.1 |
| 5,814,960 | A | * | 9/1998 | Ookura | B25J 9/046 901/23 |
| 2003/0101838 | A1 | * | 6/2003 | Shinozaki | B25J 15/0009 74/490.05 |
| 2017/0173802 | A1 | * | 6/2017 | David | B25J 9/1676 |
| 2019/0209264 | A1 | * | 7/2019 | Seo | B25J 19/002 |
| 2019/0337149 | A1 | * | 11/2019 | Landberg | F15B 15/04 |
| 2020/0338756 | A1 | * | 10/2020 | Zhang | B25J 15/0014 |

FOREIGN PATENT DOCUMENTS

| | | |
|---|---|---|
| DE | 21 2013 000 250 U1 | 10/2015 |
| JP | 2000-158365 A | 6/2000 |
| JP | 2018-192595 A | 12/2018 |
| JP | 2020-128754 A | 8/2020 |
| JP | 2021-087368 A | 6/2021 |
| WO | 2014/005583 A1 | 1/2014 |

OTHER PUBLICATIONS

International Search Report for PCT/JP2021/044320, dated Feb. 15, 2022.

* cited by examiner

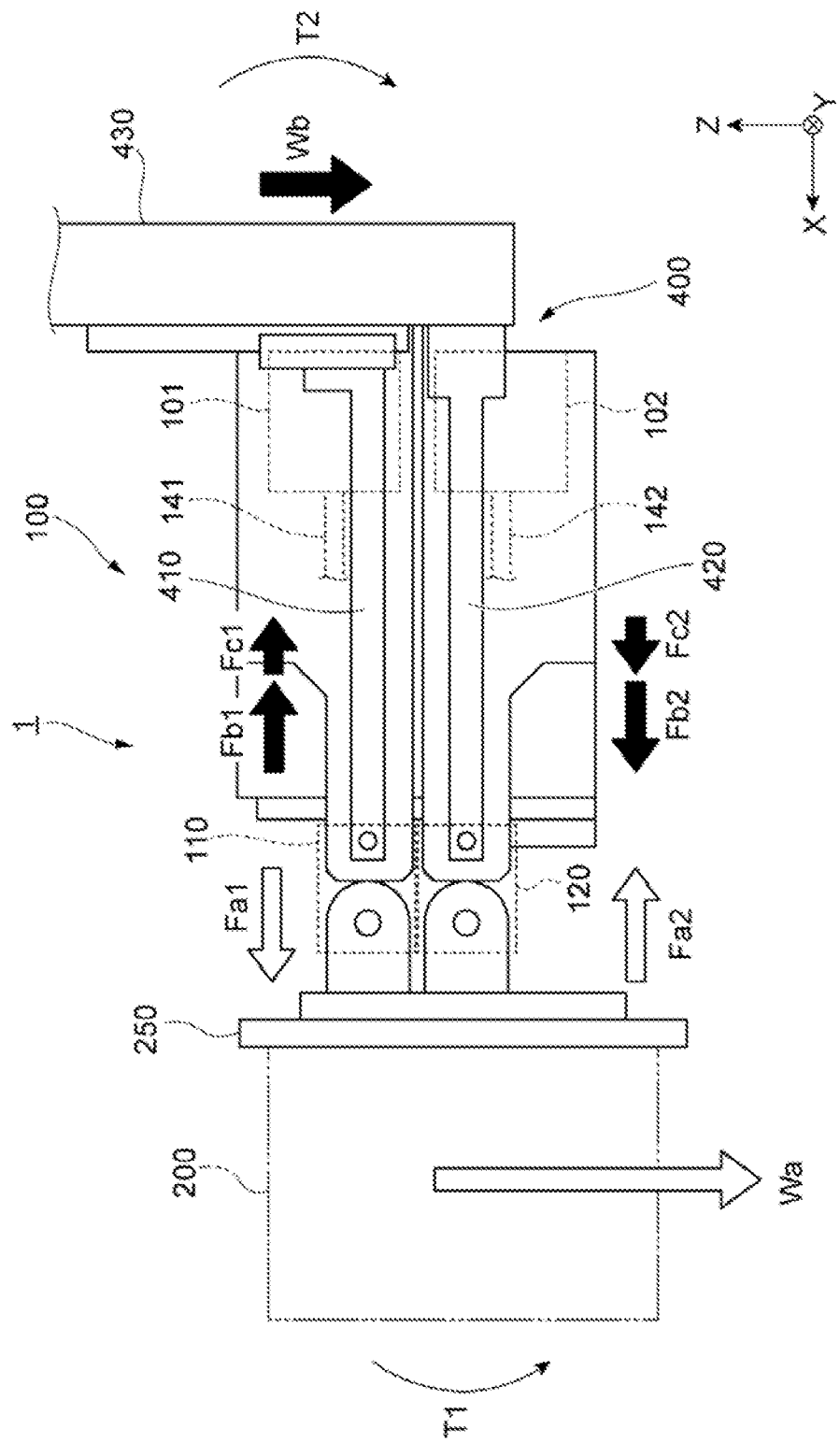

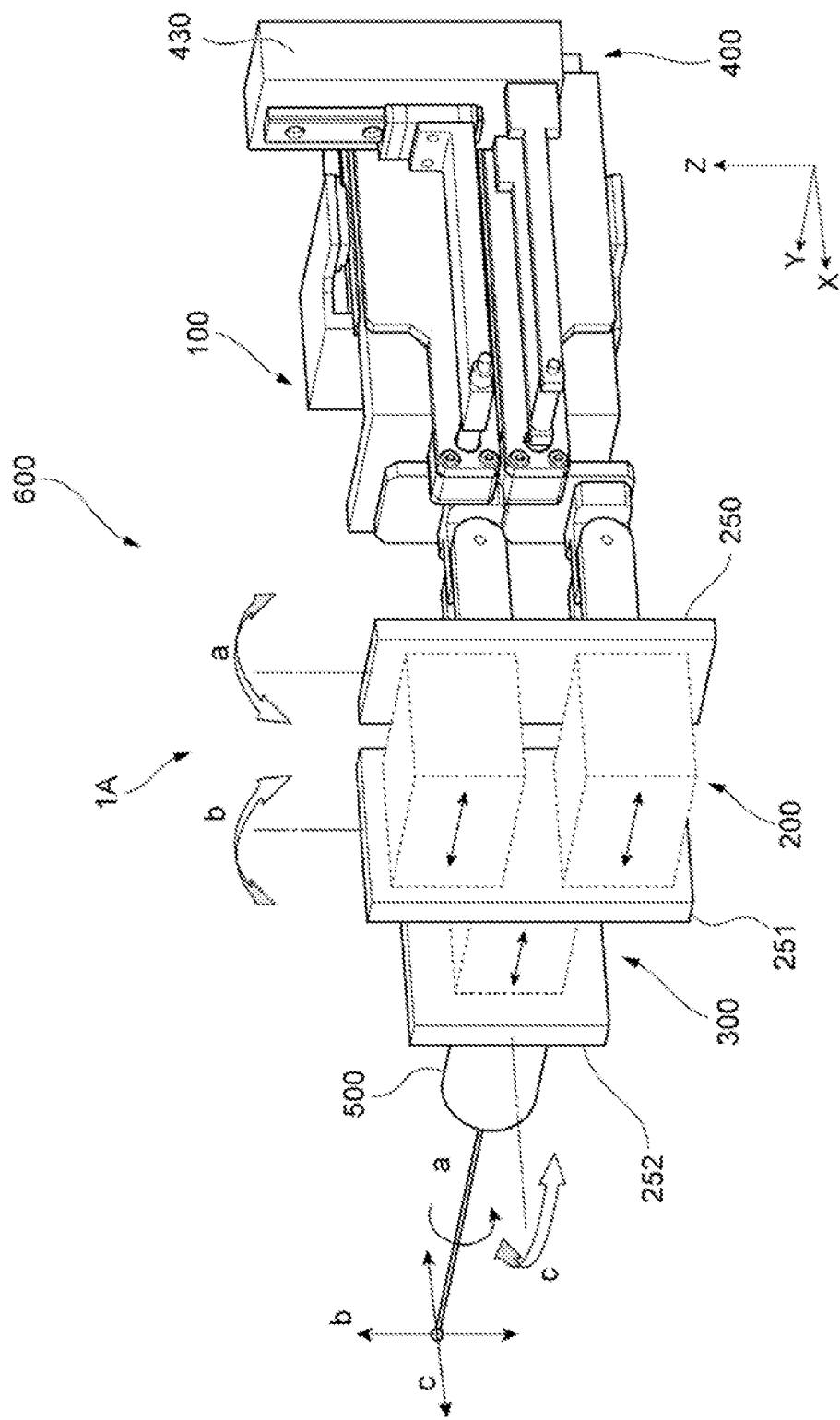

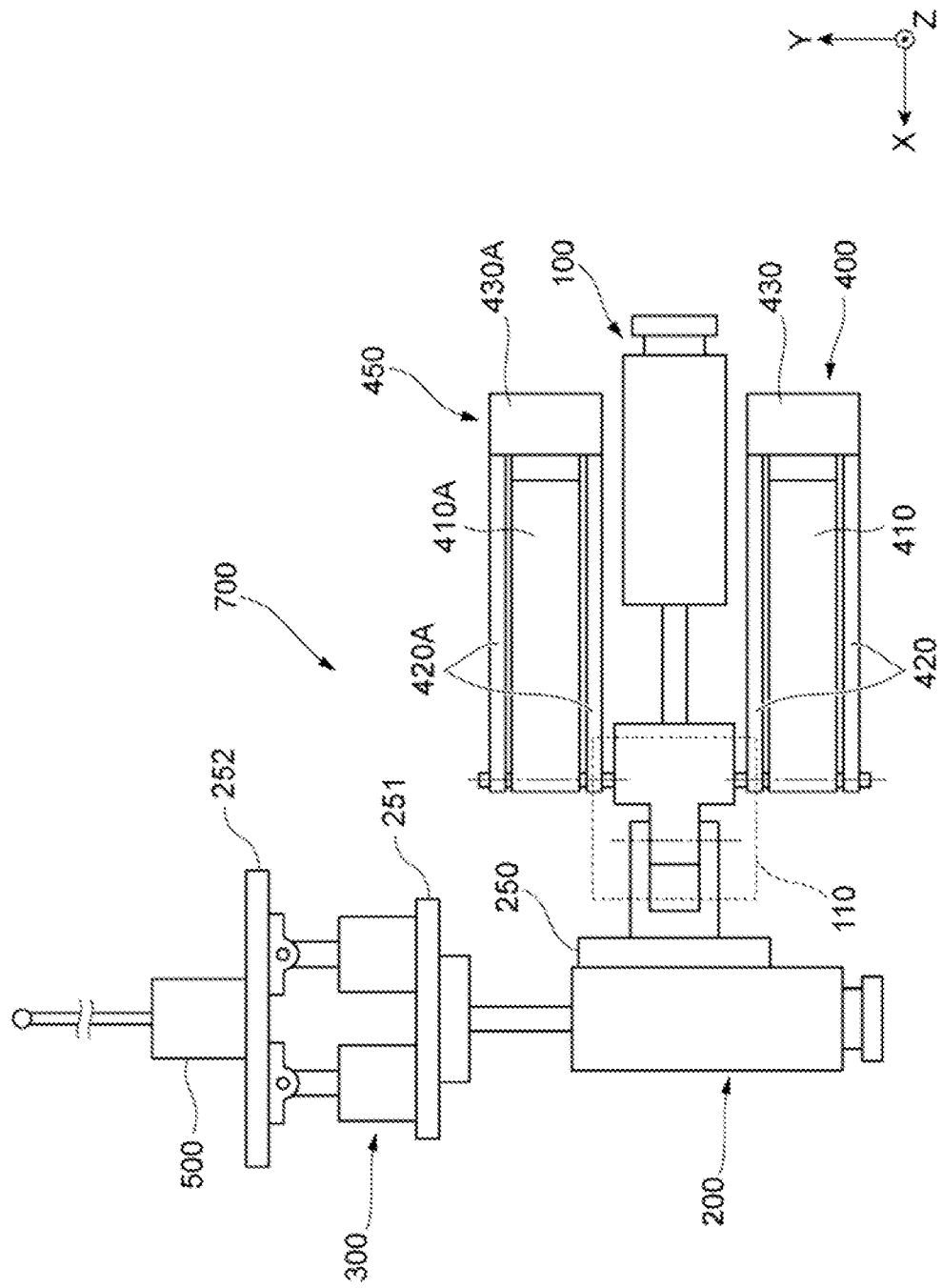

ROBOT MECHANISM AND PARALLEL LINK ROBOT

CROSS REFERENCE TO RELATED APPLICATIONS

This application is a National Stage of PCT international application Ser. No. PCT/JP2021/044320 filed on Dec. 2, 2021 which designates the United States, incorporated herein by reference, and which is based upon and claims the benefit of priority from Japanese Patent Application No. 2021-118750 filed on Jul. 19, 2021, the entire contents of which are incorporated herein by reference.

FIELD

The present disclosure relates to a robot mechanism and a parallel link robot.

BACKGROUND

Parallel links in which a plurality of links are connected in parallel are superior to serial links in which a single link is connected in series in terms of precision, strength, and other characteristics and are used in various industrial fields. Patent Literature 1 discloses a mechanism in which a gravity compensation mechanism, such as a spring member, is mounted on a parallel link mechanism to generate compensation force for maintaining the posture of a loading part when the posture changes.

Patent Literature 2 discloses an operation device in which a plurality of parallel link mechanisms each including a pair of linkages and a pair of arms are disposed between a base and an operating part to enable changing and detecting the posture of the operating part. The pair of linkages of the parallel link mechanism is provided with a counterweight (mass body) at the proximal end opposite to the distal end connected to the arm and prevents the operating part from being depressed by its own weight with braking torque generated by the weight of the mass body. With this configuration, the linkage can be maintained at the home position.

Patent Literature 3 discloses a robot (manipulator) mechanism in which parallel link mechanisms are mounted in series. Such a structure of connecting parallel link mechanisms in series (serial) has the advantage that the robot can be made small in size and is suitably used for surgical systems.

CITATION LIST

Patent Literature

Patent Literature 1: Japanese Patent Application Laid-open No. 2020-128754
Patent Literature 2: Japanese Patent Application Laid-open No. 2018-192595
Patent Literature 3: German Utility Model No. 212013000250

Technical Problem

The device disclosed in Patent Literature 1 has a configuration in which the gravity compensation mechanism, such as a spring member, is mounted on the parallel link mechanism. With this configuration, a driver may possibly unintentionally move to a position where the compensation force by the spring member is balanced with the load. The operation device disclosed in Patent Literature 2 is a mechanism in which the mass body is mounted on the parallel link mechanism to prevent the operating part from falling due to its own weight. With this configuration, the mass body itself increases in size, thereby disadvantageously increasing the weight of the entire device.

To employ the surgical system disclosed in Patent Literature 3, it is necessary to secure safety in an unexpected event, such as loss of power. When loss of power occurs, the manipulator may possibly fall by its own weight. If the manipulator falls by its own weight, it may possibly injure an affected part. Especially in ophthalmic (retinal) surgery, falling by its own weight can lead to serious accidents, such as loss of eyesight. It is necessary to consider such matters in terms of safety design.

For the foregoing reasons, there is a need fora robot mechanism including a plurality of parallel link mechanisms connected in series and a parallel link robot that are made lighter and smaller and can reduce unintentional movement of a driver.

SUMMARY

The present disclosure has the following aspects.
(1) A robot mechanism provided with a parallel link comprising a first output base, a first parallel link mechanism disposed on a first side of the first output base, and a second parallel link mechanism and an end effector disposed on a second side of the first output base, wherein the first parallel link mechanism comprises: a first driver configured to generate a linear motion output; and a second driver configured to generate a linear motion output, and a tilting link mechanism comprising a mass body that generates a second moment load in a direction to reduce a first moment load exerted on the first parallel link mechanism by the weight of the second parallel link mechanism and the end effector is connected to the first driver and the second driver.
(2) A parallel link robot comprising the robot mechanism according to (1).

Advantageous Effects of Invention

According to the present disclosure, a robot mechanism including a plurality of parallel link mechanisms connected in series is made lighter and smaller and can reduce unintentional movement of a driver.

BRIEF DESCRIPTION OF DRAWINGS

FIG. 6 is a view for explaining the relation between forces generated in a first parallel link mechanism.

FIG. 9 is a perspective view of a schematic configuration of a parallel link robot.

FIG. 10 is a top view schematically illustrating another example of the configuration of the parallel link robot.

DESCRIPTION OF EMBODIMENTS

Embodiments according to the present invention are described below in detail with reference to the drawings.

<Schematic Model of the Present Invention>

Figure 1A:
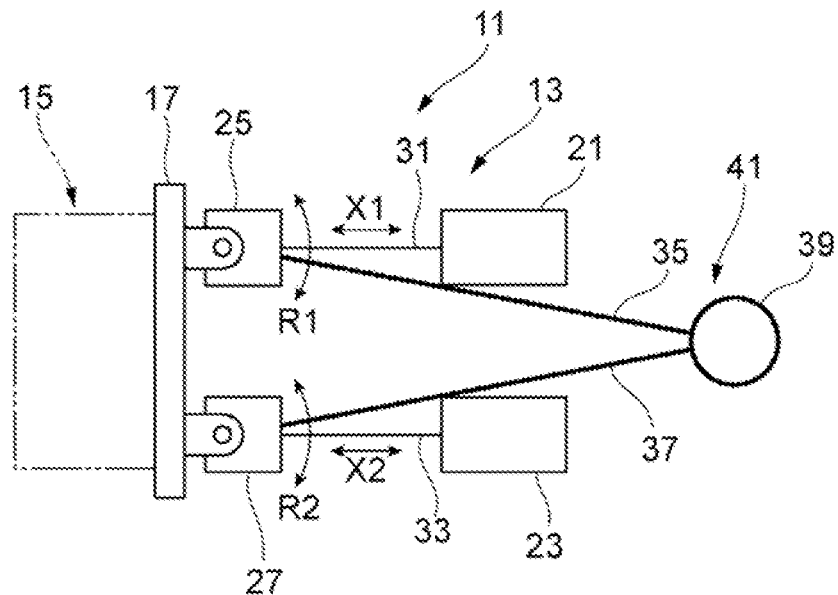
FIG. 1A is a diagram of a schematic model of a robot mechanism according to the present disclosure and illustrates a reference state.
Figure 1B:
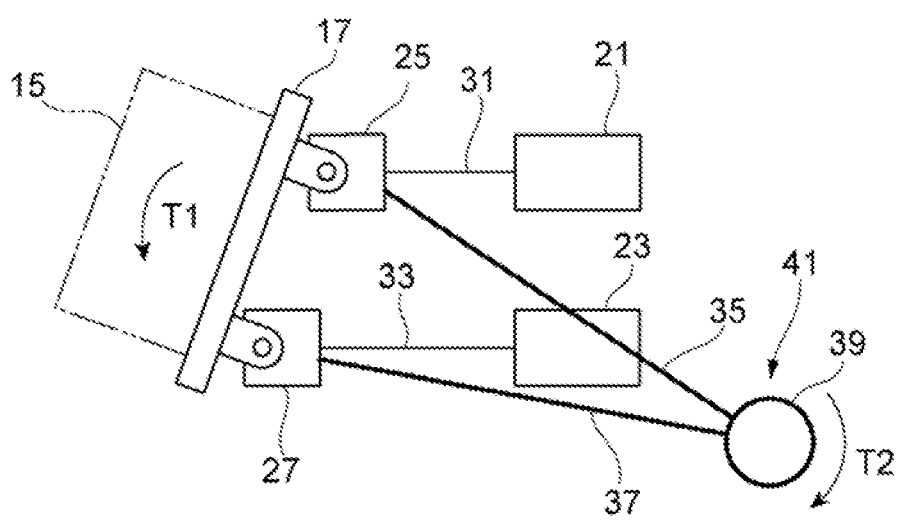
FIG. 1B is a diagram illustrating a state where a first output base rotates in the clockwise direction from the reference state illustrated in FIG. 1A.
Figure 1C:
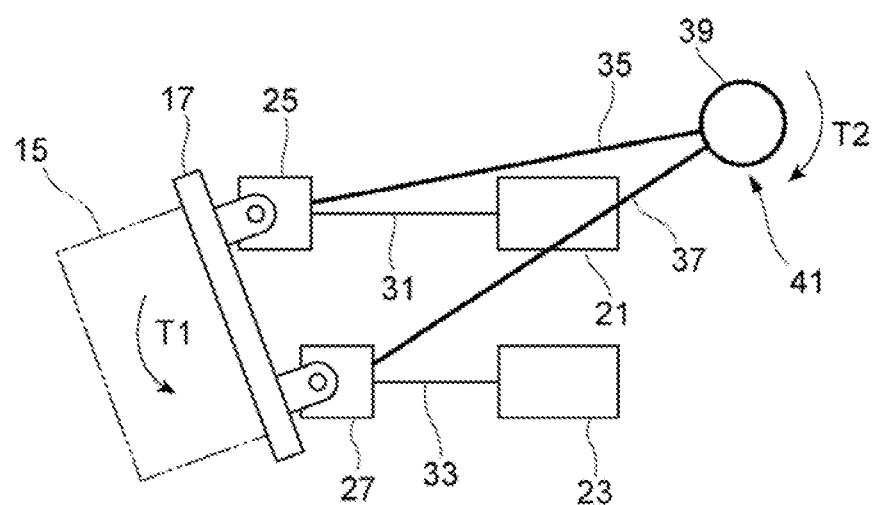
FIG. 1C is a diagram illustrating a state where the first output base rotates in the counterclockwise direction from the reference state illustrated in FIG. 1A.

The configuration and the action of a robot mechanism according to the present disclosure are described first using a simplified schematic model. FIG. 1A is a diagram of a schematic model of a robot mechanism 11 according to the present disclosure and illustrates a reference state. FIG. 1B is a diagram illustrating a state where a first output base 17 rotates in the clockwise direction from the reference state illustrated in FIG. 1A. FIG. 1C is a diagram illustrating a state where the first output base 17 rotates in the counterclockwise direction from the reference state illustrated in FIG. 1A. The robot mechanism 11 includes a first output base 17, a first parallel link mechanism 13, and a second parallel link mechanism 15. The first parallel link mechanism 13 is disposed on a first side of the first output base 17. The second parallel link mechanism 15 is disposed on a second side of the first output base 17. The first parallel link mechanism 13 is composed of a plurality of links (a first linkage 31 and a second linkage 33, which will be described later) connected in parallel. The second parallel link mechanism 15 is supported on the second side of the first output base 17. When the first parallel link mechanism 13 is driven to tilt the first output base 17 connected to the first parallel link mechanism 13, the entire second parallel link mechanism 15 tilts. While the detailed configuration of the second parallel link mechanism 15 is not illustrated in the figures, the second parallel link mechanism 15 may be a parallel link mechanism or the like in which a plurality of links are connected in parallel in a similar manner to the first parallel link mechanism 13. In addition, one or a plurality of other parallel link mechanisms can be further connected to the second parallel link mechanism 15. In an actual operation, an end effector that performs work on an object is connected to the distal end of the parallel link mechanism including the second parallel link mechanism 15.

The first parallel link mechanism 13 includes a first linkage 31, a second linkage 33, a first driver 21, a second driver 23, a first support 25, and a second support 27. The first driver 21 can generate a linear motion output to drive the long first linkage 31 forward and backward in a linear movement direction X1. The second driver 23 can generate a linear motion output to drive the long second linkage 33 forward and backward in a linear movement direction X2. The first support 25 is disposed on the first side of the first output base 17 and is connected to the end of the first linkage 31 opposite to the first driver 21 side. The second support 27 is disposed on the first side of the first output base 17 so as to be away from the first support 25 and is connected to the end of the second linkage 33 opposite to the second driver 23 side. The first support 25 rotatably (in an R1 direction) supports the first output base 17, and the second support 27 rotatably (in an R2 direction) supports the first output base 17.

The robot mechanism 11 further includes a tilting link mechanism 41 including a first arm 35, a second arm 37, and a mass body 39. A first end of the first arm 35 is rotatably (in the R1 direction) supported by the first support 25. A first end of the second arm 37 is rotatably (in the R2 direction) supported by the second support 27. The mass body 39 is connected to second ends of the first arm 35 and the second arm 37. The first arm 35 and the second arm 37, however, are not connected to the first support 25 and the second support 27, respectively, but are simply rotatably supported by them. Substantially, the first arm 35 is connected to the first linkage 31 and the first driver 21, and the second arm 37 is connected to the second linkage 33 and the second driver 23.

From the reference state of the robot mechanism 11 illustrated in FIG. 1A, the first driver 21 moves the first support 25 backward along the linear movement direction X1 via the first linkage 31 (moves it to the right in FIG. 1A), and the second driver 23 moves the second support 27 forward along the linear movement direction X2 via the second linkage 33 (moves it to the left in FIG. 1A). As a result, as illustrated in FIG. 1B, the first output base 17 rotates in the clockwise direction, and the first output base 17 and the second parallel link mechanism 15 tilt upward. In synchronization with this, the first arm 35 and the second arm 37 rotate clockwise about the first support 25 and the second support 27, respectively.

From the reference state of the robot mechanism 11 illustrated in FIG. 1A, the first driver 21 moves the first support 25 forward along the linear movement direction X1 via the first linkage 31 (moves it to the left in FIG. 1A), and the second driver 23 moves the second support 27 backward along the linear movement direction X2 via the second linkage 33 (moves it to the right in FIG. 1A). As a result, as illustrated in FIG. 1C, the first output base 17 rotates in the counterclockwise direction, and the first output base 17 and the second parallel link mechanism 15 tilt downward. In synchronization with this, the first arm 35 and the second arm 37 rotate counterclockwise.

Movement to be originally performed by the robot mechanism 11 is the movement of tilting of the first output base 17 and the second parallel link mechanism 15. This movement can be performed by cooperation of the first driver 21, the second driver 23, the first support 25, and the second support 27. If the tilting link mechanism 41 including the first arm 35, the second arm 37, and the mass body 39 is not provided, however, the following inconveniences may possibly occur.

In the state illustrated in FIG. 1B where the first output base 17 and the second parallel link mechanism 15 tilt upward, first tilting torque T1 that acts to rotate the first output base 17 counterclockwise is generated by the weight of the second parallel link mechanism 15. If the first tilting torque T1 is generated, the robot mechanism 11 needs to maintain the state illustrated in the figure.

The first tilting torque T1, however, generates action force that causes the second driver 23 to displace the second linkage 33 in the linear movement direction X1 (backward direction) and action force that causes the first driver 21 to displace the first linkage 31 in the linear movement direction X1 (forward direction). If static holding force originally belonged to the first driver 21 and the second driver 23 (e.g., holding force exerted when the power is off) is larger than this action force, the state illustrated in FIG. 1B can be maintained. By contrast, if the static holding force of the first driver 21 and the second driver 23 is smaller than the action force described above, the action force by the first tilting torque T1 exceeds the static holding force when the power of the robot mechanism 11 is turned off due to a power failure or other causes. As a result, the first output base 17 and the second parallel link mechanism 15 move in the direction of the first tilting torque T1.

Also in the state illustrated in FIG. 1C where the first output base 17 and the second parallel link mechanism 15 tilt downward, the first tilting torque T1 in the counterclockwise direction is generated by the weight of the second parallel link mechanism 15. As a result, the first output base 17 and the second parallel link mechanism 15 move in the direction of the first tilting torque T1 in a similar manner to the state illustrated in FIG. 1B.

To prepare for such a situation, the robot mechanism 11 with this configuration includes the tilting link mechanism 41. The mass body 39 of the tilting link mechanism 41 generates second tilting torque T2 that has an opposite direction to that of the first tilting torque T1 and counters the first tilting torque T1, in the first linkage 31 and the first driver 21 and in the second linkage 33 and the second driver 23 via the first arm 35 and the second arm 37. The second tilting torque T2 reduces the first tilting torque T1 and is balanced and in equilibrium with the first tilting torque T1 by being combined with frictional moment of the mechanical mechanism constituting the parallel links. As a result, the second tilting torque T2 can restrain displacement in the first driver 21 and displacement in the second driver 23 caused by the first tilting torque T1. In other words, the second tilting torque T2 having a direction opposite to that of the first tilting torque T1 is generated in the first linkage 31 and the first driver 21 and in the second linkage 33 and the second driver 23 to which the first tilting torque T1 is applied to bring the tilting between the first parallel link mechanism 13 and the second parallel link mechanism 15 into equilibrium by the first support 25 and the second support 27.

The mass body 39 is disposed away from the first support 25 and the second support 27 that support the first output base 17, along the first arm 35 and the second arm 37. Therefore, the mass body 39 can generate larger second tilting torque T2 as it is farther away from the first support 25 and the second support 27 serving as the centers of rotation. In this arrangement relation, the mass body 39 can generate the second tilting torque T2 in the opposite direction that can sufficiently cancel out the first tilting torque T1 generated by the weight of the second parallel link mechanism 15, without particularly increasing the weight of the mass body 39. Therefore, the displacement caused in the first driver 21 and the second driver 23 can be reliably restrained by the mass body 39, even when the mass body 39 is relatively light in weight. As described above, the second tilting torque T2 can be freely changed by adjusting the weight of the mass body 39, the arm length of each of the first arm 35 and the second arm 37, or both.

In the schematic model of the robot mechanism 11 described above, the important configuration is that the first parallel link mechanism 13 includes the first driver 21 and the second driver 23 and that the tilting link mechanism 41 including the mass body 39 is provided. The mass body 39 is included in the tilting link mechanism 41, thereby generating the second tilting torque T2. The second tilting torque T2 is a moment load acting on the first driver 21 and the second driver 23 in a direction to reduce the moment load exerted on the first parallel link mechanism 13 by the weight of the second parallel link mechanism 15 (and the end effector), that is, the first tilting torque T1. As a result, the first parallel link mechanism 13 can be restrained from unintentionally moving due to the weight of the second parallel link mechanism 15 and other components. Therefore, the configuration of the first linkage 31 and the first support 25 of the first parallel link mechanism 13, the second linkage 33 and the second support 27 of the second parallel link mechanism 15, and the like can be modified, and they are not essential members. The first arm 35 and the second arm 37 that rotatably connect the mass body 39 to the first support 25 and the second support 27 can also be modified and are not essential members.

<Robot Mechanism>

Figure 2:
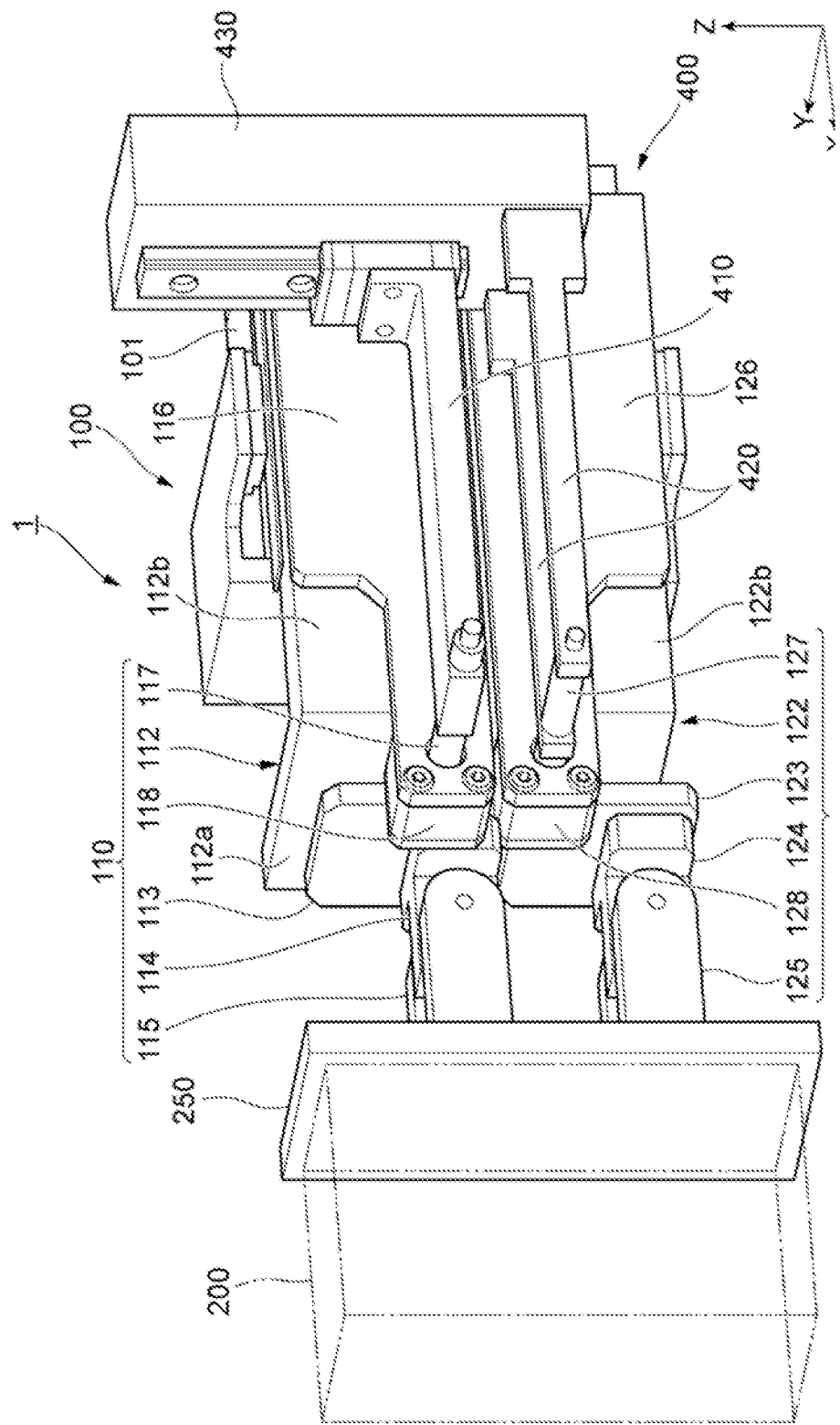
FIG. 2 is a perspective view of a robot mechanism according to an embodiment of the present invention.
Figure 3:
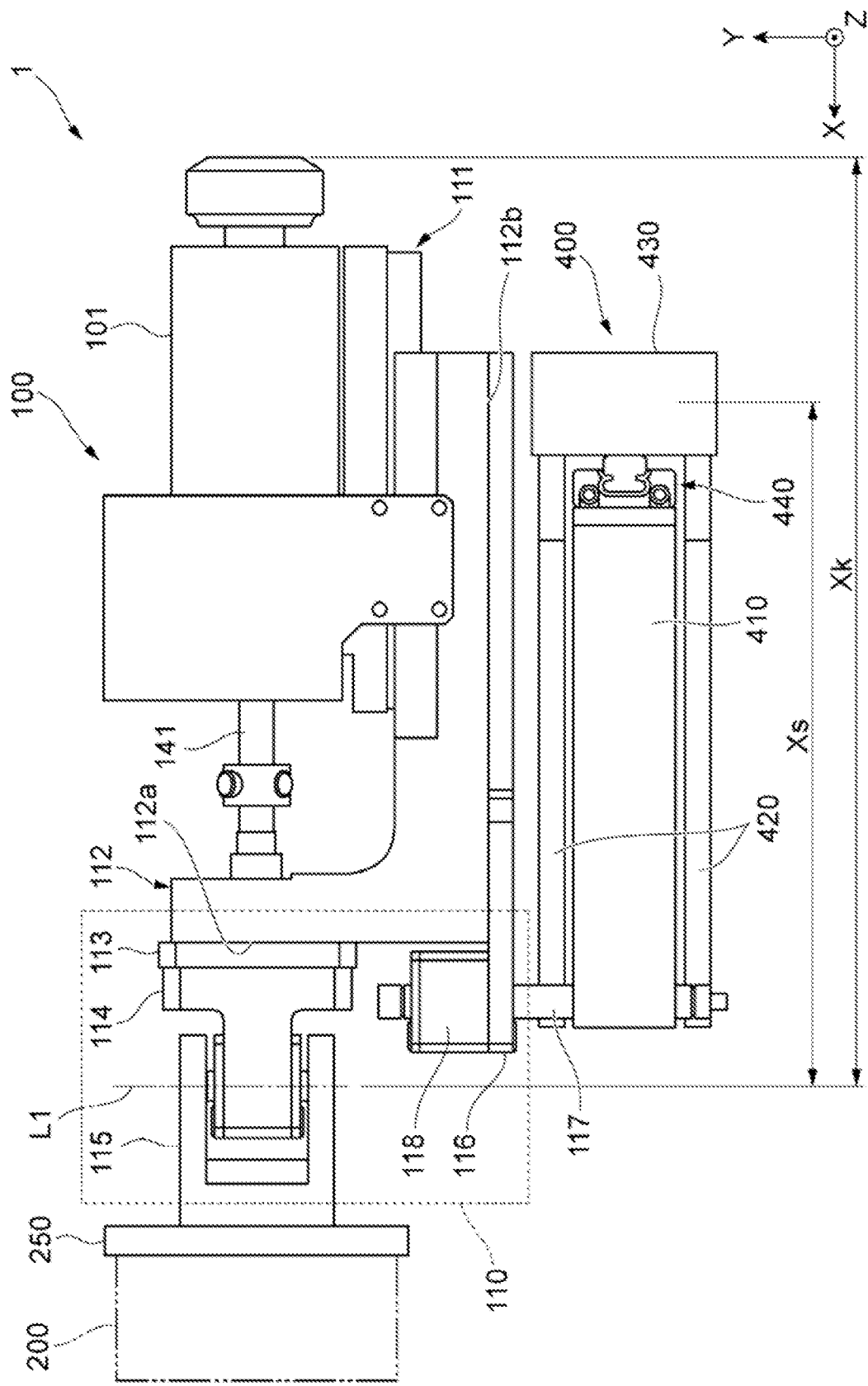
FIG. 3 is a top view of the robot mechanism illustrated in FIG. 2.

The following describes an example of a configuration that embodies the robot mechanism 11 in the schematic model described above. FIG. 2 is a perspective view of a robot mechanism 1 according to an embodiment of the present invention. FIG. 3 is a top view of the robot mechanism 1 illustrated in FIG. 2.

The robot mechanism 1 includes a first output base 250, a first parallel link mechanism 100, and a second parallel link mechanism 200. The first parallel link mechanism 100 is disposed on a first side of the first output base 250. The second parallel link mechanism 200 is disposed on a second side of the first output base 250.

The first output base 250 can tilt in any desired direction by driving the first parallel link mechanism 100. The first output base 250 supports the second parallel link mechanism 200. Therefore, the first parallel link mechanism 100 can tilt the entire second parallel link mechanism 200 in any desired direction.

The first parallel link mechanism 100 includes a first driver 101 and a first linkage 141 illustrated in FIG. 3, a second driver 102 (refer to FIG. 6) disposed under the first driver 101, a second linkage 142 (refer to FIG. 6), a first support 110, and a second support 120 (refer to FIG. 6) disposed under the first support 110. The first driver 101 and the second driver 102 have the same configuration, and the first support 110 and the second support 120 have the same configuration.

As illustrated in FIG. 3, the first driver 101 and the second driver 102 are each composed of an actuator, such as an air cylinder, a hydraulic cylinder, and a motor-driven sliding mechanism, and function as a driving source of the robot mechanism 1. The first driver 101 can generate a linear motion output to drive the long first linkage 141 forward and backward, and the second driver 102 can generate a linear motion output to drive the long second linkage 142 (refer to FIG. 6) forward and backward. As used herein, the driving direction of the first driver 101 and the second driver 102 and the movement direction of the first support 110 and the second support 120 are an X-direction, the vertical direction is a Z-direction (height direction), and the direction orthogonal to the X- and Z-directions is a Y-direction. The first driver 101 and the second driver 102 are disposed away from each other in the Z-direction on the first side of the first output base 250.

The first linkage 141 is connected, at its proximal end, to the first driver 101 and moves the first support 110 forward and backward in the X-direction by the driving of the first driver 101. The second linkage 142, which is not illustrated in the figure because it is similar to the first linkage 141, is connected, at its proximal end, to the second driver 102 and moves the second support 120 forward and backward in the X-direction by the driving of the second driver 102.

The first support 110 is disposed on the first side of the first output base 250 (right side in FIG. 3). The first support 110 is connected to the distal end of the first linkage 141 and implements a function of connecting the first driver 101 and the first linkage 141 to the first output base 250. The first support 110 is composed of a plurality of members and includes a first frame 112, a first connection plate 113, a first driving side bracket 114, a first driven side bracket 115, a first fixed plate 116, and a first support shaft 117.

The first frame 112 has an L-shape when viewed from the Z-direction as illustrated in FIG. 3 and is supported by the first driver 101 with a sliding mechanism 111 capable of moving in the X-direction interposed therebetween. In other words, the first frame 112 is supported by the first driver 101 in a manner capable of moving forward and backward in the X-direction by the driving of the first driver 101.

The first connection plate 113 fixes the first driving side bracket 114 to a base facing surface 112a of the first frame 112 extending along the Y-direction. The first driving side bracket 114 is, rotatably about an axis L1, connected to the first driven side bracket 115 fixed to the first output base 250.

As illustrated in FIG. 2, the first fixed plate 116 is fixed to an outer surface 112b of the first frame 112 extending in the X-direction and is integrally provided with a support 118 that supports the first support shaft 117. In other words, the first support 110 is configured by integrating the first frame 112, the first connection plate 113, the first driving side bracket 114, the first fixed plate 116, and the first support shaft 117 supported by the support 118.

The second support 120 is disposed away from the first support 110 on the first side of the first output base 250 and is connected to the distal end of the second linkage 142 (refer to FIG. 6). With this configuration, the second support 120 implements a function of connecting the second driver 102 and the second linkage 142 to the first output base 250. The second support 120 includes a second frame 122, a second connection plate 123, a second driving side bracket 124, a second driven side bracket 125, a second fixed plate 126, and a second support shaft 127 supported by a support 128. The elements of the second support 120 have the same functions as those of the first fixed plate 116, the first frame 112, the first connection plate 113, the first driving side bracket 114, the first driven side bracket 115, the first fixed plate 116, and the first support shaft 117 of the first support 110.

Details of the second parallel link mechanism 200 are not illustrated in FIG. 2. In an actual operation, an end effector that performs work on an object is attached to the distal end of the second parallel link mechanism 200 opposite to the first output base 250 side. Details of the end effector will be described later (refer to FIGS. 9 and 10). In addition, one or a plurality of other parallel link mechanisms can be further connected to the second parallel link mechanism 200. In this case, the end effector is connected to the distal end of the other parallel link mechanism.

The robot mechanism 1 further includes a tilting link mechanism 400 that is attached to the first parallel link mechanism 100 and generates second tilting torque having a direction opposite to that of first tilting torque generated by the weight of the second parallel link mechanism 200 (and the end effector) and balanced with the first tilting torque. In the present specification, "torque" is used with the same meaning as "moment load".

The tilting link mechanism 400 includes a first arm 410, a pair of second arms 420, and a mass body 430. A first end of the first arm 410 is rotatably supported by the first support shaft 117 of the first support 110. A first end of each of the pair of second arms 420 is rotatably supported by the second support shaft 127 of the second support 120. The mass body 430 is connected to second ends of the first arm 410 and the pair of second arms 420. The first arm 410 and the second arm 420, however, are not connected to the first support 110 and the second support 120, respectively, but are simply rotatably supported by them via the respective support shafts.

Substantially, the first arm 410 is connected to the first linkage 141 and the first driver 101 of the first parallel link mechanism 100, and a second arm 320 is connected to the second linkage 142 and the second driver 102.

The first arm 410 has a first end connected to the first support shaft 117, thereby being rotatably supported relatively to the first support 110. The second arm 420 has a first end connected to the second support shaft 127, thereby being rotatably supported relatively to the second support 120. The first arm 410 and the second arm 420 are disposed parallel to the longitudinal direction (X-direction) of the first linkage 141 and the second linkage 142, that is, along the linear motion direction of the first driver 101 and the second driver 102. Thus, the tilting link mechanism 400 is disposed in parallel with the first driver 101 and the second driver 102 and does not greatly protrude from the first driver 101 and the second driver 102. Therefore, the tilting link mechanism 400 is disposed so as not to prevent downsizing of the robot mechanism 1.

The mass body 430 is a block-shaped member with a predetermined weight and is preferably made of metal material, such as steel. The mass body 430 is connected to the second ends of the first arm 410 and the second arm 420 in a manner capable of changing the distance between them.

Figure 4:
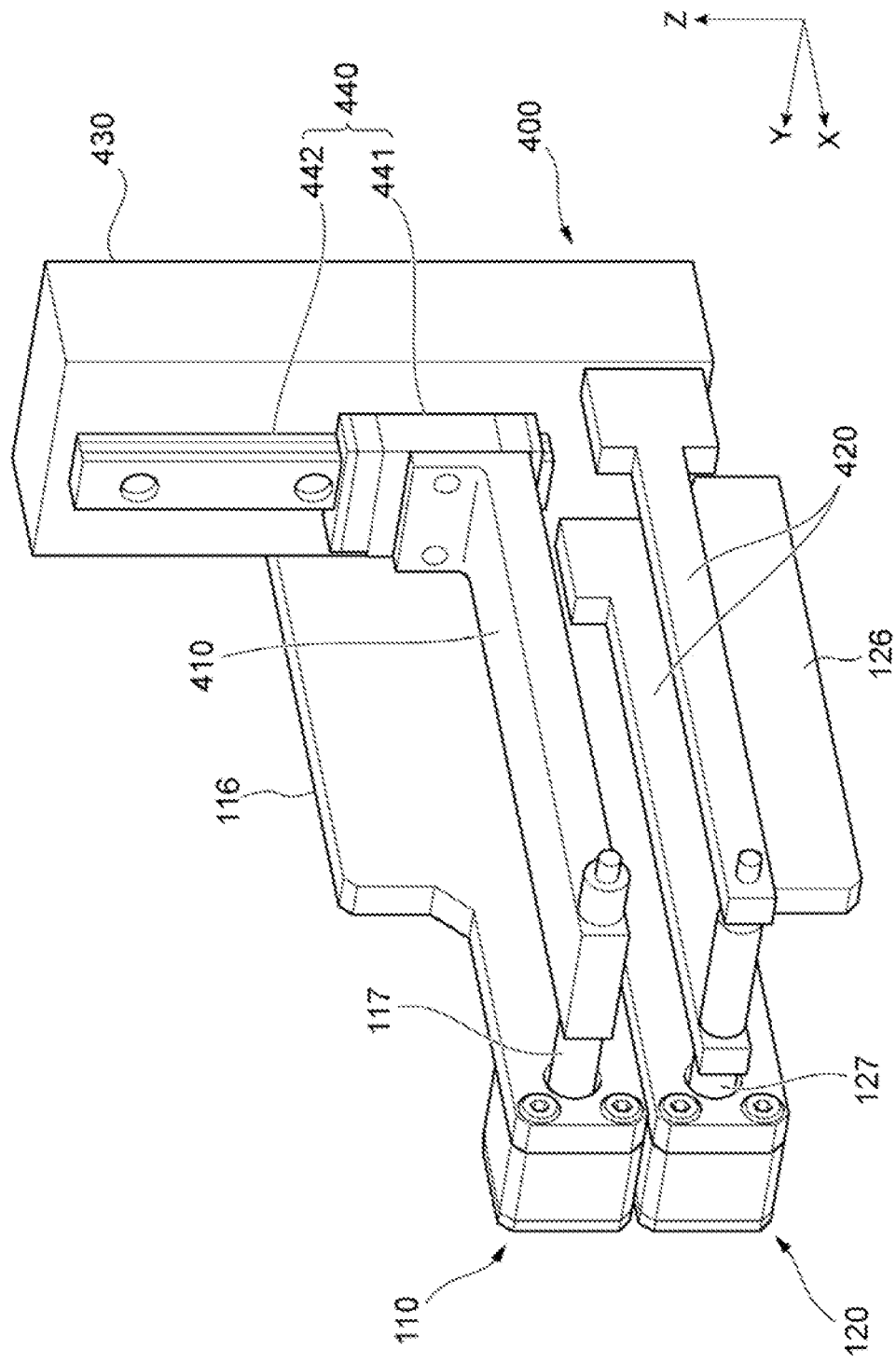
FIG. 4 is a perspective view of a main part of a tilting link mechanism.

FIG. 4 is a perspective view of a main part of the tilting link mechanism 400. The mass body 430 includes a slider mechanism 440. The slider mechanism 440 includes a slider 441 and a rail 442. The slider 441 is fixed to the second end of the first arm 410. The rail 442 is fixed to the mass body 430. The second end of the second arm 420 is directly fixed to the mass body 430.

The slider 441 is movably supported along the rail 442, thereby being able to change the distance between the first arm 410 and the second arm 420 and improving the rotational flexibility of the first arm 410 and the second arm 420.

The slider mechanism 440 may be provided to the second end of the second arm 420 instead of to the second end of the first arm 410. In other words, the mass body 430 is fixed to the second end of one of the first arm 410 and the second arm 420, and the slider 441 connects the second end of the other arm of the first arm 410 and the second arm 420 to the mass body 430. The mass body 430 may be provided with a mechanism corresponding to the slider mechanism 440 inside thereof.

Figure 5A:
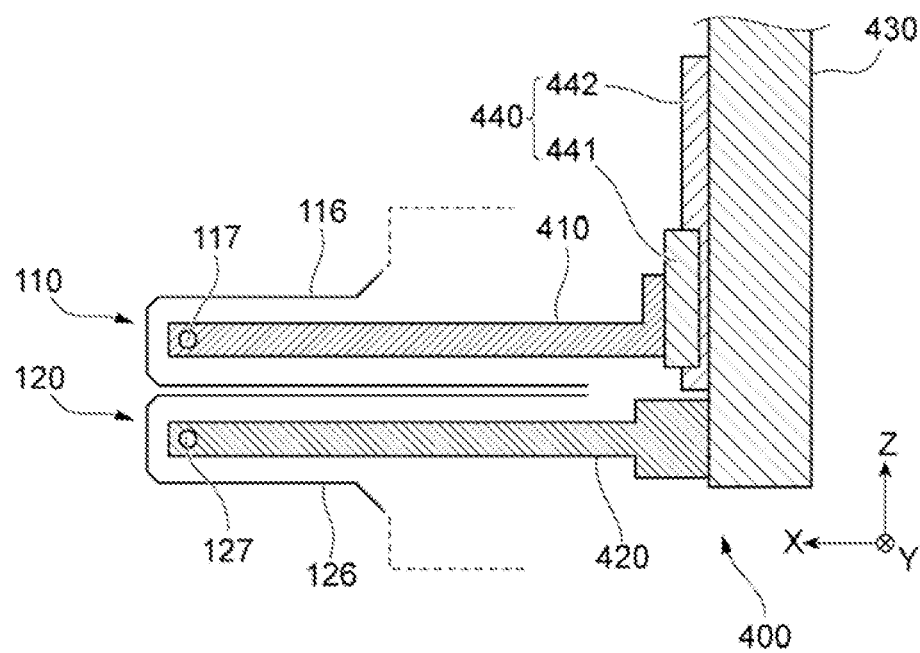
FIG. 5A is a view of the tilting link mechanism in the reference state (corresponding to FIG. 1A) viewed from a Y-direction.
Figure 5B:
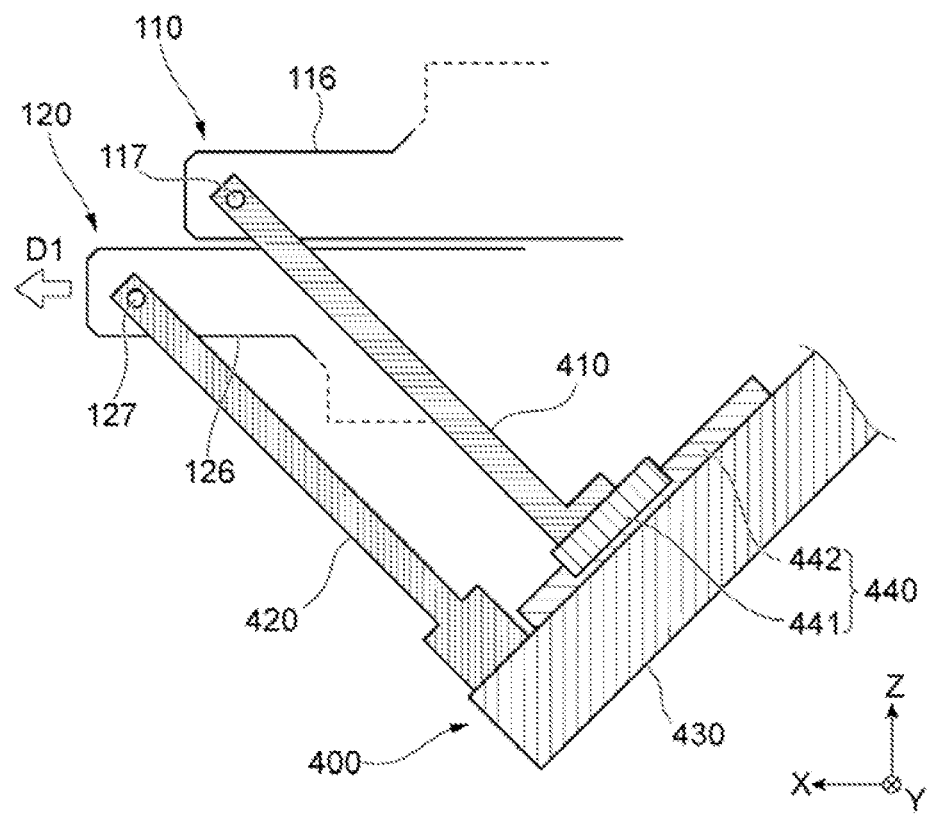
FIG. 5B is a view of the tilting link mechanism corresponding to FIG. 1B viewed from the Y-direction.

FIG. 5A is a view of the tilting link mechanism 400 in the reference state (corresponding to FIG. 1A) viewed from the Y-direction. FIG. 5B is a view of the tilting link mechanism 400 corresponding to FIG. 1B viewed from the Y-direction. As described above, the first fixed plate 116 of the first support 110 and the second fixed plate 126 of the second support 120 independently move in the X-direction by the driving of the first driver 101 and the second driver 102. With this movement, the first arm 410 rotates about the first support shaft 117 in the ZX-plane, and the second arm 420 rotates about the second support shaft 127 in the ZX-plane.

When, for example, the second fixed plate 126 moves in the direction of an arrow D1 toward the first output base along the X-direction as illustrated in FIG. 5B (corresponding to FIG. 1B) from the reference state illustrated in FIG. 5A (corresponding to FIG. 1A), the first arm 410 and the second arm 420 rotate clockwise about the first support shaft 117 and the second support shaft 127, respectively. At this time, the slider 441 moves upward along the rail 442, thereby changing the distance between the second end of the first arm 410 and the second end of the second arm 420. As a result, the first arm 410 and the second arm 420 can rotate smoothly and have larger ranges of movement. When the first fixed plate 116 moves in the direction of the arrow D1 or when the second fixed plate 126 moves in the direction opposite to the direction of the arrow D1, the first arm 410 and the second arm 420 rotate counterclockwise. Also in this case, the distance between the second end of the first arm 410 and the second end of the second arm 420 changes, thereby allowing them to rotate smoothly.

One of the first arm 410 and the second arm 420 may have the first end rotatable with respect to the corresponding support, and the other may have the first end slidable and rotatable with respect to the corresponding support. In this case, the mass body 430 can be fixed to the second ends of the two arms. Also in this case, the distance between the first ends of the first arm 410 and the second arm 420 changes, thereby allowing them to rotate smoothly.

The following describes the action of the tilting link mechanism 400. FIG. 6 is a view for explaining the relation between forces generated in the first parallel link mechanism 100. Assume a case where the second parallel link mechanism 200 is fixed to the first output base 250 and the weight of both of the first output base 250 and the second parallel link mechanism 200 is loaded on the first parallel link mechanism 100.

At this time, first tilting torque T1 (which can also be referred to as a first moment load) in the counterclockwise direction is generated in the first output base 250 by the weight of the second parallel link mechanism 200 with a weight Wa. The first tilting torque T1 generates action force Fa1 that pulls back the first linkage 141 from the first driver 101 via the first support 110 with respect to the first output base 250 serving as a starting point. The first tilting torque T1 also generates action force Fa2 that pushes back the second linkage 142 toward the second driver 102 via the second support 120 with respect to the first output base 250 serving as a starting point. In other words, the first tilting torque T1 generates the action forces Fa1 and Fa2 in the first driver 101 and the second driver 102 via the first support 110 and the second support 120 and via the first linkage 141 and the second linkage 142, respectively.

By contrast, the tilting link mechanism 400 generates second tilting torque T2 (which can also be referred to as a second moment load) having a direction opposite to that of the first tilting torque T1 in the first linkage 141 and the first driver 101 and in the second linkage 142 and the second driver 102 via the first arm 410 and the second arm 420 by the weight of the mass body 430 with a weight Wb. The second tilting torque T2 generates, in the first linkage 141 and the first driver 101, action force Fb1 that pulls back the first linkage 141 toward the first driver 101. The second tilting torque T2 also generates, in the second linkage 142 and the second driver 102, action force Fb2 that pushes back the second linkage 142 toward the second parallel link mechanism 200.

The first driver 101 and the second driver 102 generate static holding force for maintaining the static state without any change. Therefore, the first driver 101 generates action force Fc1 that counters the action force Fa1 by the weight Wa as the static holding force, and the second driver 102 generates action force Fc2 that counters the action force Fa2 by the weight Wa as the static holding force.

Thus, in the first support 110, the action force Fa1 due to the first tilting torque T1 generating the weight Wa corresponding to the weight of the second parallel link mechanism 200 is balanced with the action force Fb1 due to the second tilting torque T2 generating the weight Wb corresponding to the weight of the mass body 430 and the action force Fc1 generated by the first driver 101. Similarly, in the second support 120, the action force Fa2 is balanced with the action force Fb2 and the action force Fc2. In other words, the action force Fa1 and the action force Fa2 due to the first tilting torque T1 are in equilibrium with the action force Fb1 and the action force Fb2 due to the second tilting torque T2 and the action force Fc1 generated by the first driver 101 and the action force Fc2 generated by the second driver 102. If the second parallel link mechanism 200 is attached to the first output base 250, this configuration can restrain the first driver 101 and the second driver 102 from being unintentionally displaced in the X-direction by the weight of the second parallel link mechanism 200. Therefore, the parts constituting the first parallel link mechanism 100 are not affected by the weight of the second parallel link mechanism 200 when they are stopped and moved, thereby enabling accurate positioning and smooth movement.

To offset the first tilting torque T1 received by the first output base 250 connected to the first parallel link mechanism 100 due to the weight of the second parallel link mechanism 200 by the second tilting torque T2 of the tilting link mechanism 400, at least one of the weight of the mass body 430 and the arm length of each of the first arm 410 and the second arm 420 simply needs to be adjusted such that the following Expressions (1) and (2) are satisfied. This adjustment can be performed on the assumption that the action force Fc1 (static holding force) by the first driver 101 and the action force Fc2 (static holding force) by the second driver 102 are constant.

$$Fb1 \leq Fa1 \leq Fb1 + Fc1 \quad (1)$$

$$Fb2 \leq Fa2 \leq Fb2 + Fc2 \quad (2)$$

In other words, the second tilting torque T2 is set so as to generate the action forces Fb1 and Fb2 obtained by subtracting the action forces (static holding forces) Fc1 and Fc2 generated by the first driver 101 and the second driver 102 from the action forces Fa1 and Fa2 generated in the first driver 101 and the second driver 102 by the first tilting torque T1. By considering the action forces Fc1 and Fc2 generated by the first driver 101 and the second driver 102, the required minimum first tilting torque can be generated, thereby minimizing an increase in weight (e.g., reducing the weight of the mass body 430).

If the first driver 101 and the second driver 102 do not have the static holding force, that is, Fc1=Fc2=0 is satisfied, the action force due to the first tilting torque T1 and the action force due to the second tilting torque T2 simply need to be in equilibrium. In other words, the action forces Fa1 and Fa2 generated in the first driver 101 and the second driver 102 by the first tilting torque T1 via the first support 110 and the second support 120 and via the first linkage 141 and the second linkage 142 with respect to the first output base 250 serving as a starting point are in equilibrium with the action forces Fb1 and Fb2 generated in the first support 110 and the second support 120 by the second tilting torque T2.

In the above description, it is assumed that the first tilting torque T1 and the second tilting torque T2 are generated by the weight Wa of the second parallel link mechanism 200 and the weight Wb of the mass body 430, respectively, to simplify the explanation. In an actual configuration, however, the weight of each of other members associated with each part (e.g., other members, such as the first output base 250, for the weight Wa and other members, such as the first arm 410 and the second arm 420, for the weight Wb) also affect the tilting torque. For more precise setting, the weight of each of the other members described above simply need to be included. In particular, the weight Wa is the sum of at least the weight of the end effector and the weight of the second parallel link mechanism 200 because the end effector is necessarily connected to the second parallel link mechanism 200 in work.

The mass body 430 is included in the tilting link mechanism 400, thereby generating the second tilting torque T2 (second moment load). The second tilting torque T2 is a moment load acting on the first driver 101 and the second driver 102 in a direction to reduce the moment load exerted on the first parallel link mechanism 100 by the weight Wa of the second parallel link mechanism 200 (and the end effector), that is, the first tilting torque T1 (first moment load). As a result, the first parallel link mechanism 100 can be restrained from unintentionally moving due to the weight of the second parallel link mechanism 200 and other components.

In other words, it is important that the tilting link mechanism 400 and the mass body 430 are connected to the first driver 101 and the second driver 102. The tilting link mechanism 400 according to the embodiment is connected to the first driver 101 via the first arm 410, the first linkage 141, and other components and to the second driver 102 via the second arm 420, the second linkage 142, and other components. The connection form of the tilting link mechanism 400 to the first driver 101 and the second driver 102 described above, however, is given by way of example only. The configuration of the first linkage 141 and the first support 110 of the first parallel link mechanism 100 and the second linkage 142 and the second support 120 of the second parallel link mechanism can be modified, and they are not essential members. The first arm 410 and the second arm 420 that rotatably support the mass body 430 on the first support 110 and the second support 120 can also be modified and are not essential members.

Figure 7:
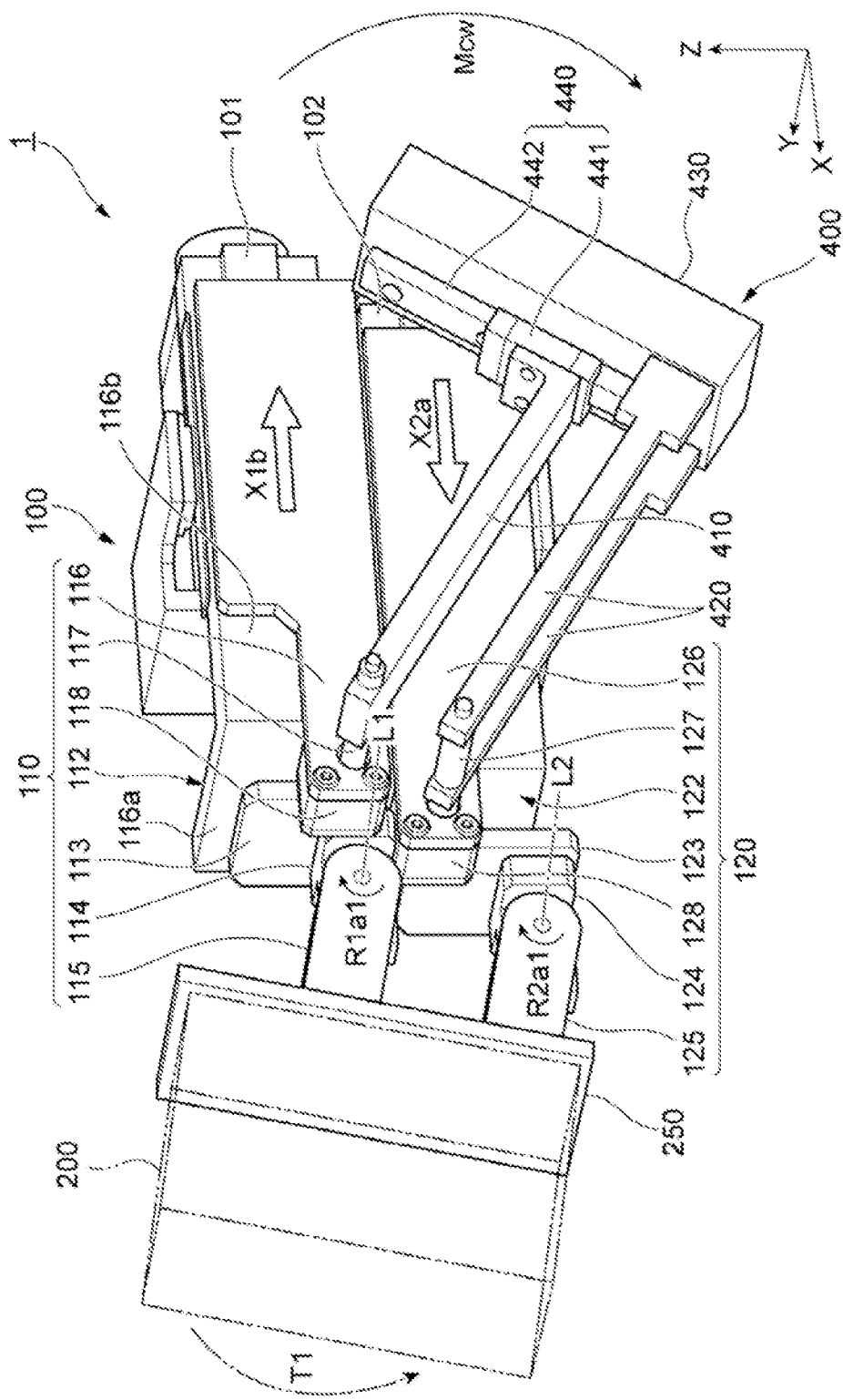
FIG. 7 is a perspective view of the robot mechanism illustrating movement of a mass body in the case of tilting a second parallel link mechanism upward.

The following describes the action of the tilting link mechanism 400 based on a specific operation of the robot mechanism 1 illustrated in FIG. 2. FIG. 7 is a perspective view of the robot mechanism 1 illustrating movement of the mass body 430 in the case of tilting the second parallel link mechanism 200 upward. FIG. 7 illustrates transition from the schematic model illustrated in FIG. 1A to the state illustrated in FIG. 1B.

To tilt the second parallel link mechanism 200 upward, the first driver 101 pulls back the first linkage 141 (refer to FIG. 6) and moves the first support 110 along the direction of an arrow X1b. As a result, the first frame 112, the first connection plate 113, the first driving side bracket 114, and the first driven side bracket 115 of the first support 110 move along the direction of the arrow X1b.

By contrast, the second driver 102 pushes the second linkage 142 (refer to FIG. 6) forward along the direction of an arrow X2a and moves the second support 120 along the direction of the arrow X2a. As a result, the second frame 122, the second connection plate 123, the second driving side bracket 124, and the second driven side bracket 125 of the second support 120 move along the direction of the arrow X2a.

The first driven side bracket 115 is rotatably connected to the first driving side bracket 114 about the axis L1, and the second driven side bracket 125 is also rotatably connected to the second driving side bracket 124 about the axis L2. When the first driving side bracket 114 moves in the X1b-direction, and the second driving side bracket 124 moves in the X2a-direction, the first driven side bracket 115 rotates in an R1a1-direction about the axis L1, and the second driven side bracket 125 rotates in an R2a1-direction about the axis L2. As a result, the first output base 250 tilts in such a direction that the second parallel link mechanism 200 faces upward.

In synchronization with this movement, the first arm 410 of the tilting link mechanism 400 rotates clockwise about the first support shaft 117 in the XZ-plane, and the second arm 420 rotates clockwise about the second support shaft 127 in the XZ-plane. As a result, the mass body 430 connected to the first arm 410 and the second arm 420 rotates clockwise in the XZ-plane as indicated by an arrow Mcw.

When the second parallel link mechanism 200 tilts upward, the first tilting torque T1 in the counterclockwise direction is generated in the first output base 250 by the weight of the second parallel link mechanism 200 and acts in a direction to tilt the first output base 250. The first tilting torque T1 causes displacement in the first driver 101 in a direction opposite to the direction of the arrow X1b via the first support 110 and displacement in the second driver 102 in a direction opposite to the direction of the arrow X2a via the second support 120. Thus, the action force due to the first tilting torque T1 acts on the first driver 101 and the second driver 102. The action force due to the first tilting torque T1, however, is balanced and in equilibrium with the action force generated by the second tilting torque T2 of the tilting link mechanism 400 and the static holding force of the first driver 101 and the second driver 102. In other words, the tilting link mechanism 400 applies the second tilting torque T2 from the mass body 430 to the first output base 250, thereby bringing the tilting of the first output base 250 into equilibrium. As a result, the first output base 250 can be stably held.

With this restraint action of external force, the second parallel link mechanism 200 tilting upward illustrated in FIG. 7 is restrained from tilting downward that would be caused by its own weight and can always maintain its original state of tilting upward. If an unexpected event, such as loss of power, occurs when the second parallel link mechanism 200 tilts upward, for example, the robot mechanism 1 can maintain the static state.

Figure 8:
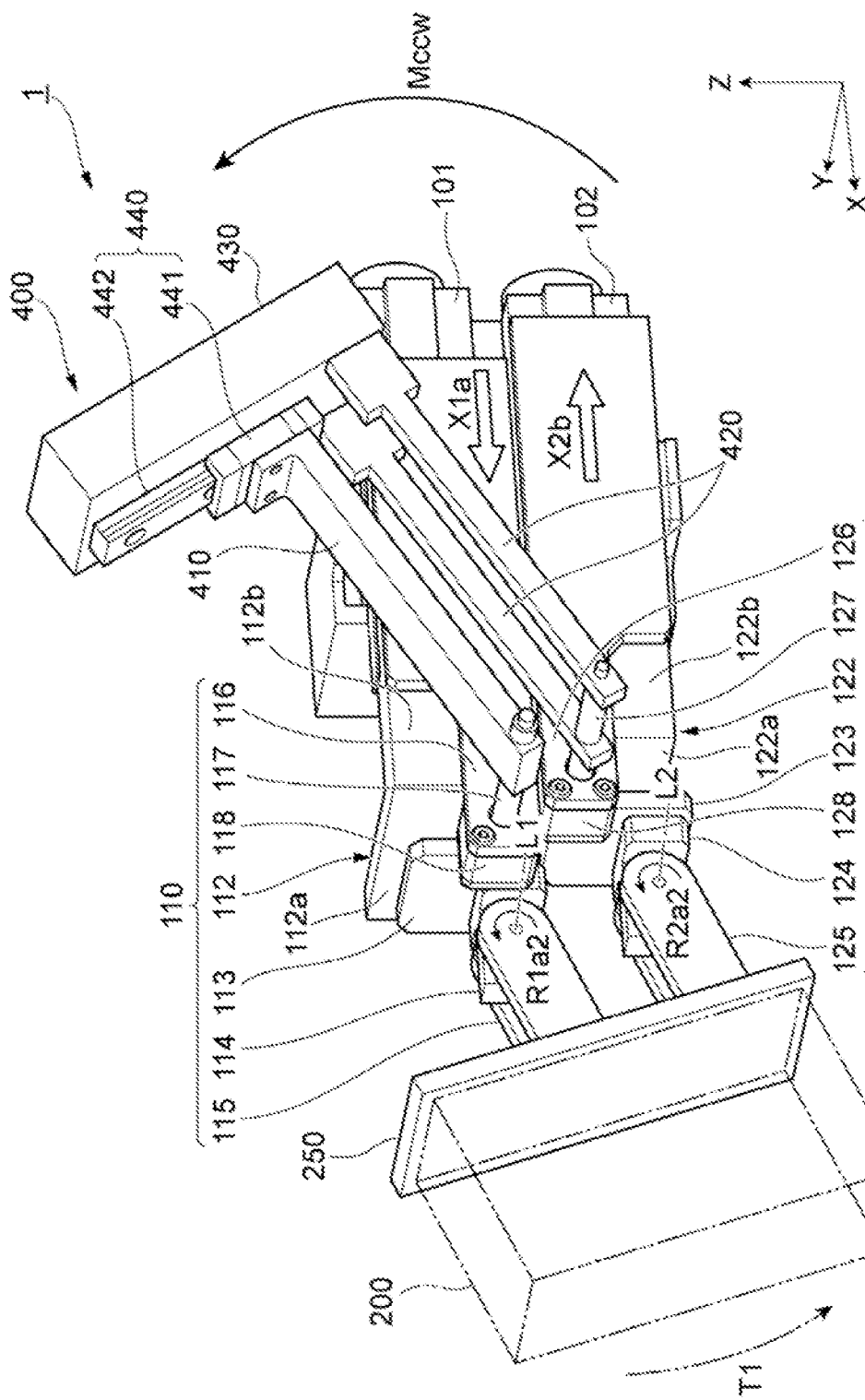
FIG. 8 is a perspective view of the robot mechanism illustrating movement of the mass body in the case of tilting the second parallel link mechanism downward.

FIG. 8 is a perspective view of the robot mechanism 1 illustrating movement of the mass body 430 in the case of tilting the second parallel link mechanism 200 downward. FIG. 8 illustrates transition from the schematic model illustrated in FIG. 1A to the state illustrated in FIG. 1C.

To tilt the second parallel link mechanism 200 downward, the first driver 101 pushes back the first linkage 141 (refer to FIG. 6) toward the first output base 250 and moves the first support 110 along the direction of an arrow X1a. As a result, the first frame 112, the first connection plate 113, the first driving side bracket 114, and the first driven side bracket 115 of the first support 110 move along the direction of the arrow X1a.

By contrast, the second driver 102 pulls back the second linkage 142 (refer to FIG. 6) and moves the second support 120 along the direction of an arrow X2b. As a result, the second frame 122, the second connection plate 123, the second driving side bracket 124, and the second driven side bracket 125 of the second support 120 move along the direction of the arrow X2b.

When the first driving side bracket 114 moves in the X1a-direction, and the second driving side bracket 124 moves in the X2b-direction, the first driven side bracket 115 rotates in an R1a2-direction about the axis L1, and the second driven side bracket 125 rotates in an R2a2-direction about the axis L2. As a result, the first output base 250 tilts in such a direction that the second parallel link mechanism 200 faces downward.

In synchronization with this movement, the first arm 410 of the tilting link mechanism 400 rotates counterclockwise about the first support shaft 117 in the XZ-plane, and the second arm 420 rotates counterclockwise about the second support shaft 127 in the XZ-plane. As a result, the mass body 430 connected to the first arm 410 and the second arm 420 rotates counterclockwise in the XZ-plane as indicated by an arrow Mccw.

When the second parallel link mechanism 200 tilts downward, the first tilting torque T1 in the counterclockwise direction is generated in the first output base 250 by the weight of the second parallel link mechanism 200 and acts in a direction to tilt the first output base 250. Also in this case, the first tilting torque T1 causes displacement in the first driver 101 in a direction opposite to the direction of the arrow X1a via the first support 110 and displacement in the second driver 102 in a direction opposite to the direction of the arrow X2b via the second support 120. Thus, the action force due to the first tilting torque T1 acts on the first driver 101 and the second driver 102. The action force due to the first tilting torque T1, however, is balanced and in equilibrium with the action force generated by the second tilting torque T2 of the tilting link mechanism 400 and the static holding force of the first driver 101 and the second driver 102. In other words, the tilting link mechanism 400 applies the second tilting torque T2 from the mass body 430 to the first output base 250, thereby bringing the tilting of the first output base 250 into equilibrium. As a result, the first output base 250 can be stably held.

Therefore, the second parallel link mechanism 200 tilting downward illustrated in FIG. 8 is restrained from tilting further downward that would be caused by its own weight and can always maintain its original state. If an unexpected event, such as loss of power, occurs when the second parallel link mechanism 200 tilts downward, for example, the robot mechanism 1 can maintain the static state.

As illustrated in FIG. 3, the mass body 430 is disposed away from the axis L1 of the first support 110 by a distance Xs along the longitudinal direction of the first arm 410. Similarly, the mass body 430 is disposed away from the axis L2 of the second support 120 by the distance Xs along the longitudinal direction of the second arm 420, which is not illustrated in the figure. The second tilting torque generated in the axes L1 and L2 (in particular, the portions of the first support 110 and the second support 120 on the axes L1 and L2) by the mass body 430 is determined by the product of the distance Xs and the mass (weight Wb) of the mass body 430. To obtain the same torque value, a longer distance Xs can reduce the mass of the mass body 430. In other words, extending the distance Xs can make the mass body 430 lighter in weight, thereby making the entire device lighter in weight.

The first driver 101 is disposed in a region from the axis L1 of the first support 110 to a distance Xk along the longitudinal direction (X-direction) of the first linkage 141. By disposing the mass body 430 within the region from the axis L1 to the distance Xk, the mass body 430 does not protrude from the first driver 101. In this case, the mass body 430 is disposed at a position overlapping the arrangement region of the first driver 101 and the second driver 102 in the longitudinal direction of the first linkage 141 and the second linkage 142, that is, in the linear motion direction of the first driver 101 and the second driver 102. With this configuration, the mass body 430 does not protrude from the arrangement region of the first driver 101 and the second driver 102, and the tilting link mechanism 400 can be compactly added to the robot mechanism 1. This configuration can restrain the tilting link mechanism 400 from interfering with surrounding members and make the entire device smaller in size.

<Parallel Link Robot>

The following describes an example of a parallel link robot including the robot mechanism 1 with the configuration described above. FIG. 9 is a perspective view of a schematic configuration of a parallel link robot 600. A robot mechanism 1A includes the first parallel link mechanism 100, the second parallel link mechanism 200, and a third parallel link mechanism 300. The first parallel link mechanism 100 is provided with the tilting link mechanism 400. The third parallel link mechanism 300 serves as at least one additional parallel link mechanism connected to them in series. Therefore, the robot mechanism 1A has greater flexibility in posture and movement of the distal end shaft.

In the parallel link robot 600 with the present configuration, an end effector 500 for performing desired work is connected to a third output base 252 driven by the third parallel link mechanism 300 fixed to a second output base 251. The weight of the mass body 430 of the tilting link mechanism 400 is set to correspond to the weight of the second parallel link mechanism 200, the third parallel link mechanism 300, and the end effector 500.

The end effector 500 is a working member attached to the distal end shaft of the parallel link robot 600, and various working members, such as a stylus that touches an object and a pin that moves an object, can be employed as the end effector 500. In the present configuration, the first parallel link mechanism 100 outputs driving force in θa- and X-directions, the second parallel link mechanism 200 outputs driving force in θb- and Y-directions, and the third parallel link mechanism 300 outputs driving force in θc- and Y-directions. As a result, the distal end of the end effector 500 can be driven in five degrees of freedom: two orthogonal axes in the θb- and θc-directions, the θa-direction corresponding to rotation of the distal end shaft, and the X- and Y-directions of the distal end shaft.

In the parallel link robot 600 with the present configuration, the weight of the second parallel link mechanism 200, the weight of the third parallel link mechanism 300, and the weight of the end effector 500 are supported by the first parallel link mechanism 100. In the first parallel link mechanism 100, the first tilting torque (action force) generated by the weight supported by the first output base 250 is in equilibrium with the second tilting torque (action force) generated by the tilting link mechanism 400. Therefore, no displacement is caused in the first driver 101 or the second driver 102 described above.

Thus, the end effector 500 does not unintentionally move and has higher precision in posture and position. As a result, various works using the end effector 500 can be performed with high degrees of freedom, high precision, and high efficiency.

FIG. 10 is a top view schematically illustrating another example of the configuration of the parallel link robot. In a parallel link robot 700 with the present configuration, the first parallel link mechanism 100 is provided not only with the tilting link mechanism 400 corresponding to the weight of the second parallel link mechanism 200 but also with an auxiliary tilting link mechanism 450 corresponding to the weight of the third parallel link mechanism (additional parallel link mechanism) 300 and the end effector 500.

The auxiliary tilting link mechanism 450 has the same configuration as that of the tilting link mechanism 400 and includes an auxiliary mass body 430A, an auxiliary first arm 410A, and an auxiliary second arm 420A having the same configuration as that of the mass body 430, the first arm 410, and the second arm 420 described above. The auxiliary tilting link mechanism 450 generates, by its own weight, the second tilting torque in the first output base 250 corresponding to the weight of the third parallel link mechanism 300 and the end effector 500. With this configuration, the weight of the mass body can be placed in a distributed manner compared with a case where the total weight of the mechanisms provided after the second parallel link mechanism 200 is supported only by a single tilting link mechanism. As a result, unbalanced loads are reduced, and the weight balance is improved, thereby achieving smooth movement and making the entire device lighter in weight. In addition, by disposing the auxiliary tilting link mechanism 450 in parallel with the tilting link mechanism 400, the entire device is made smaller in size.

The mass bodies are independently provided to the tilting link mechanism 400 and the auxiliary tilting link mechanism 450. This configuration can increase versatility by, for example, replacing the mass body of the auxiliary tilting link mechanism 450 when replacing the end effector 500 and other components.

In the description above, the action force generated in the first driver and the second driver by the first tilting torque is in equilibrium with the action force generated in the first support and the second support by the second tilting torque. The "equilibrium" herein, however, includes not only a perfect equilibrium state but also a case where the two action forces are in a state close to equilibrium. This is because the first parallel link mechanism can be restrained from unintentionally moving due to the weight of the second parallel link mechanism in the state close to equilibrium.

Thus, the present invention is not limited to the embodiments described above. Combinations of the configurations according to the embodiments and modifications and applications by those skilled in the art based on the description in the specification and the known technology are also included in the present invention and falls within the scope of protection sought.

As described above, the following aspects are disclosed in the present specification.

(1) In a robot mechanism provided with a parallel link comprising a first output base, a first parallel link mechanism disposed on a first side of the first output base, and a second parallel link mechanism and an end effector disposed on a second side of the first output base, the first parallel link mechanism comprises a first driver configured to generate a linear motion output and a second driver configured to generate a linear motion output. In the robot mechanism, a tilting link mechanism comprising a mass body that generates a second moment load in a direction to reduce a first moment load exerted on the first parallel link mechanism by the weight of the second parallel link mechanism and the end effector is connected to the first driver and the second driver. In the robot mechanism, the first moment load generated in the first driver and the second driver by the weight of the second parallel link mechanism and the end effector is balanced and in equilibrium with the second moment load by the mass body. Therefore, the first parallel link mechanism is prevented from unintentionally moving due to the weight of the second parallel link mechanism.

(2) The robot mechanism according to (1), wherein the tilting link mechanism comprises a first arm having a first end rotatable with respect to the first driver, a second arm having a first end rotatable with respect to the second driver, the mass body fixed to a second end of one of the first arm and the second arm, and a slider connecting a second end of the other of the first arm and the second arm to the mass body. The robot mechanism enables the first arm and the second arm to rotate more smoothly. In addition, the first arm and the second arm have larger ranges of movement.

(3) The robot mechanism according to (1), wherein the tilting link mechanism comprises a first arm having a first end rotatable with respect to one of the first driver and the second driver, a second arm having a first end slidable and rotatable with respect to the other of the first driver and the second driver, and the mass body fixed to second ends of the first arm and the second arm. The robot mechanism enables the first arm and the second arm to rotate more smoothly. In addition, the first arm and the second arm have larger ranges of movement.

(4) The robot mechanism according to (2) or (3), wherein the first driver and the second driver are disposed away from each other on the first side of the first output base, the first moment load tilts the first output base and acts on the first driver and the second driver, and the tilting link mechanism applies the second moment load from the mass body to the first output base and brings the tilting of the first output base into equilibrium. The robot mechanism can stably hold the first output base because the second moment load brings the tilting of the first output base into equilibrium.

(5) The robot mechanism according to (4), wherein the second moment load is set by adjusting at least one of the weight of the mass body and an arm length of the first arm and the second arm. The robot mechanism enables setting an appropriate second moment load in a simpler manner. In addition, a longer arm length can reduce the weight of the mass body, thereby making the entire device lighter in weight.

(6) The robot mechanism according to (4) or (5), wherein the second moment load is set so as to generate force obtained by subtracting static holding force of the first driver and the second driver from action force generated in the first driver and the second driver by the first moment load. The robot mechanism can minimize an increase in weight by generating the required minimum second tilting torque.

(7) The robot mechanism according to any one of (4) to (6), wherein the first arm and the second arm are disposed along a linear motion direction of the first driver and the second driver. In the robot mechanism, the first arm and the second arm do not significantly protrude from the first driver and the second driver and do not prevent downsizing of the robot mechanism.

(8) The robot mechanism according to any one of (4) to (7), wherein the mass body is disposed at a position overlapping an arrangement region of the first driver and the second driver in the linear motion direction of the first driver and the second driver. In the robot mechanism, the mass body does not protrude from the arrangement region of the first driver and the second driver and is prevented from interfering with surrounding members.

(9) The robot mechanism according to any one of (4) to (8) further comprising: at least one additional parallel link mechanism is continuously connected in series with the first parallel link mechanism and the second parallel link mechanism in a connection direction of the first parallel link mechanism and the second parallel link mechanism; and an auxiliary tilting link mechanism that is configured to generate a moment load that is generated in the first output base by the weight of the additional parallel link mechanism, wherein the auxiliary tilting link mechanism comprises an auxiliary first arm having a first end rotatable with respect to the first driver, an auxiliary second arm having a first end rotatable with respect to the second driver, an auxiliary mass body fixed to a second end of one of the auxiliary first arm and the auxiliary second arm, and a slider connecting a second end of the other of the auxiliary first arm and the auxiliary second arm to the auxiliary mass body. The robot mechanism can offset, by the auxiliary tilting link mechanism, action forces generated in the first driver and the second driver by the weight of the additional parallel link mechanism.

(10) The robot mechanism according to any one of (4) to (8) further comprising: at least one additional parallel link mechanism that is continuously connected in series with the first parallel link mechanism and the second parallel link mechanism in a connection direction of the first parallel link mechanism and the second parallel link mechanism; and an auxiliary tilting link mechanism that is configured to generate a moment load that is generated in the first output base by the weight of the additional parallel link mechanism, wherein the auxiliary tilting link mechanism comprises an auxiliary first arm having a first end rotatable with respect to one of the first driver and the second driver, an auxiliary second arm having a first end slidable and rotatable with respect to the other of the first driver and the second driver, and an auxiliary mass body fixed to second ends of the auxiliary first arm and the auxiliary second arm. The robot mechanism can offset, by the auxiliary tilting link mechanism, action forces generated in the first driver and the second driver by the weight of the additional parallel link mechanism.

(11) The robot mechanism according to (9) or (10), wherein the auxiliary tilting link mechanism is disposed in parallel with the tilting link mechanism of the first parallel link mechanism. The robot mechanism has higher space efficiency and is smaller in size because the auxiliary tilting link mechanism and the tilting link mechanism are disposed in parallel.

(12) A parallel link robot comprising the robot mechanism according to any one of (1) to (11). The parallel link robot prevents the end effector from unintentionally moving and enables it to perform more accurate work with higher precision in posture and position.

The invention claimed is:

1. A robot mechanism provided with a parallel link comprising a first output base, a first parallel link mechanism disposed on a first side of the first output base, and a second parallel link mechanism and an end effector disposed on a second side of the first output base, wherein
the first parallel link mechanism comprises:
a first driver configured to generate a linear motion output;
a second driver configured to generate a linear motion output;
a first support that is driven forward and backward by the linear motion output of the first driver, in a linear movement direction and that rotatably supports the first output base;
a second support that is driven forward and backward by the linear motion output of the second driver, in the linear movement direction and that rotatably supports the first output base; and
a tilting link mechanism that is rotatably supported by the first support and the second support and that includes a mass body, and
the tilting link mechanism comprises:
a first arm having a first end rotatable with respect to the first driver;
a second arm having a first end rotatable with respect to the second driver;
the mass body fixed to a second end of one of the first arm and the second arm; and
a slider connecting a second end of the other of the first arm and the second arm to the mass body.

2. The robot mechanism according to claim 1, wherein
the mass body generates a second moment load in a direction to reduce a first moment load exerted on the first parallel link mechanism by a weight of the second parallel link mechanism and the end effector,
the first driver and the second driver are disposed away from each other on the first side of the first output base,
the first moment load tilts the first output base and acts on the first driver and the second driver, and
the tilting link mechanism applies the second moment load from the mass body to the first output base and brings the tilting of the first output base into equilibrium.

3. The robot mechanism according to claim 2, wherein the second moment load is set by adjusting at least one of a weight of the mass body and an arm length of the first arm and the second arm.

4. The robot mechanism according to claim 2, wherein the second moment load is set so as to generate force obtained by subtracting static holding force of the first driver and the second driver from action force generated in the first driver and the second driver by the first moment load.

5. The robot mechanism according to claim 2, wherein the first arm and the second arm are disposed along a linear motion direction of the first driver and the second driver.

6. The robot mechanism according to claim 2, further comprising:
at least one additional parallel link mechanism that is continuously connected in series with the first parallel link mechanism and the second parallel link mechanism in a connection direction of the first parallel link mechanism and the second parallel link mechanism; and
an auxiliary tilting link mechanism that is configured to generate a moment load that is generated in the first output base by a weight of the additional parallel link mechanism, wherein
the auxiliary tilting link mechanism comprises:
an auxiliary first arm having a first end rotatable with respect to the first driver;
an auxiliary second arm having a first end rotatable with respect to the second driver;
an auxiliary mass body fixed to a second end of one of the auxiliary first arm and the auxiliary second arm; and
a slider connecting a second end of the other of the auxiliary first arm and the auxiliary second arm to the auxiliary mass body.

7. The robot mechanism according to claim 6, wherein the auxiliary tilting link mechanism is disposed in parallel with the tilting link mechanism of the first parallel link mechanism.

8. The robot mechanism according to claim 2, further comprising:
- at least one additional parallel link mechanism that is continuously connected in series with the first parallel link mechanism and the second parallel link mechanism in a connection direction of the first parallel link mechanism and the second parallel link mechanism; and
- an auxiliary tilting link mechanism that is configured to generate tilting torque that is generated in the first output base by a weight of the additional parallel link mechanism, wherein
the auxiliary tilting link mechanism comprises:
- an auxiliary first arm having a first end rotatable with respect to one of the first driver and the second driver;
- an auxiliary second arm having a first end slidable and rotatable with respect to the other of the first driver and the second driver; and
- an auxiliary mass body fixed to second ends of the auxiliary first arm and the auxiliary second arm.

9. The robot mechanism according to claim 8, wherein the auxiliary tilting link mechanism is disposed in parallel with the tilting link mechanism of the first parallel link mechanism.

10. A parallel link robot comprising the robot mechanism according to claim 1.

11. A robot mechanism provided with a parallel link comprising a first output base, a first parallel link mechanism disposed on a first side of the first output base, and a second parallel link mechanism and an end effector disposed on a second side of the first output base, wherein
the first parallel link mechanism comprises:
- a first driver configured to generate a linear motion output;
- a second driver configured to generate a linear motion output;
- a first support that is driven forward and backward by the linear motion output of the first driver, in a linear movement direction and that rotatably supports the first output base;
- a second support that is driven forward and backward by the linear motion output of the second driver, in the linear movement direction and that rotatably supports the first output base; and
- a tilting link mechanism that is rotatably supported by the first support and the second support and that includes a mass body, and
the tilting link mechanism comprises:
- a first arm having a first end rotatable with respect to one of the first driver and the second driver;
- a second arm having a first end slidable and rotatable with respect to the other of the first driver and the second driver; and
- the mass body fixed to second ends of the first arm and the second arm.

12. The robot mechanism according to claim 11, wherein
the mass body generates a second moment load in a direction to reduce a first moment load exerted on the first parallel link mechanism by a weight of the second parallel link mechanism and the end effector,
the first driver and the second driver are disposed away from each other on the first side of the first output base,
the first moment load tilts the first output base and acts on the first driver and the second driver, and
the tilting link mechanism applies the second moment load from the mass body to the first output base and brings the tilting of the first output base into equilibrium.

13. The robot mechanism according to claim 12, wherein the second moment load is set by adjusting at least one of a weight of the mass body and an arm length of the first arm and the second arm.

14. The robot mechanism according to claim 12, wherein the second moment load is set so as to generate force obtained by subtracting static holding force of the first driver and the second driver from action force generated in the first driver and the second driver by the first moment load.

15. The robot mechanism according to claim 12, wherein the first arm and the second arm are disposed along a linear motion direction of the first driver and the second driver.

16. The robot mechanism according to claim 12, further comprising:
- at least one additional parallel link mechanism that is continuously connected in series with the first parallel link mechanism and the second parallel link mechanism in a connection direction of the first parallel link mechanism and the second parallel link mechanism; and
- an auxiliary tilting link mechanism that is configured to generate a moment load that is generated in the first output base by a weight of the additional parallel link mechanism, wherein
the auxiliary tilting link mechanism comprises:
- an auxiliary first arm having a first end rotatable with respect to the first driver;
- an auxiliary second arm having a first end rotatable with respect to the second driver;
- an auxiliary mass body fixed to a second end of one of the auxiliary first arm and the auxiliary second arm; and
- a slider connecting a second end of the other of the auxiliary first arm and the auxiliary second arm to the auxiliary mass body.

17. The robot mechanism according to claim 16, wherein the auxiliary tilting link mechanism is disposed in parallel with the tilting link mechanism of the first parallel link mechanism.

18. The robot mechanism according to claim 12, further comprising:
- at least one additional parallel link mechanism that is continuously connected in series with the first parallel link mechanism and the second parallel link mechanism in a connection direction of the first parallel link mechanism and the second parallel link mechanism; and
- an auxiliary tilting link mechanism that is configured to generate tilting torque that is generated in the first output base by a weight of the additional parallel link mechanism, wherein
the auxiliary tilting link mechanism comprises:
- an auxiliary first arm having a first end rotatable with respect to one of the first driver and the second driver;
- an auxiliary second arm having a first end slidable and rotatable with respect to the other of the first driver and the second driver; and
- an auxiliary mass body fixed to second ends of the auxiliary first arm and the auxiliary second arm.

19. The robot mechanism according to claim 18, wherein the auxiliary tilting link mechanism is disposed in parallel with the tilting link mechanism of the first parallel link mechanism.

* * * * *